March 5, 1968  F. PAERELS ETAL  3,372,217
METHOD AND APPARATUS FOR THE MANUFACTURE OF PRESSED BOARDS
Filed Oct. 30, 1961  4 Sheets-Sheet 1

INVENTORS
FRANCISCUS PAERELS
AND
WERNER ERNST HOSTETTLE.
By:- James M. Heilman
ATTORNEY Fig. 4
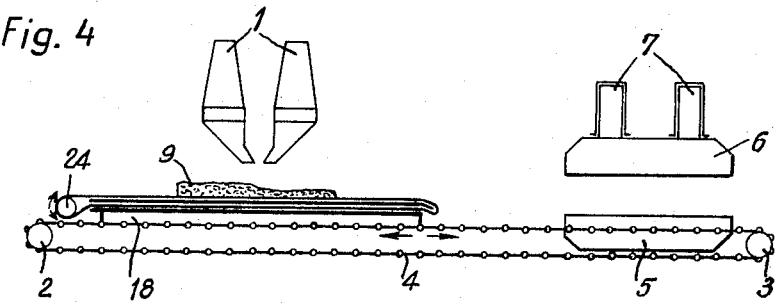
Fig. 5
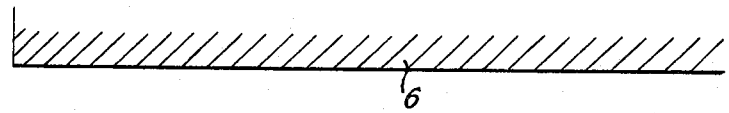
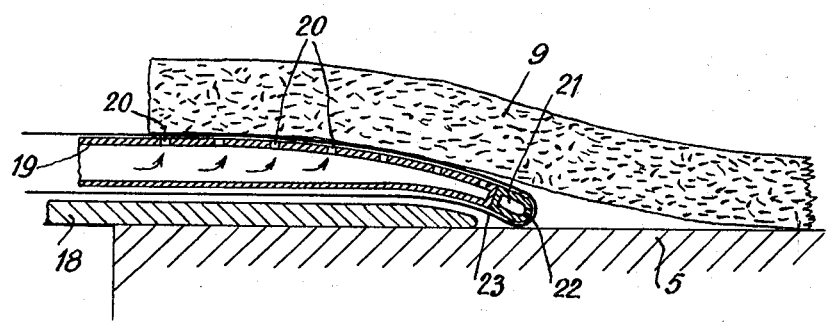
INVENTORS
FRANCISCUS PAERELS
AND WERNER ERNST HOSTETTLER
BY:- James M. Heilman
ATTORNEY

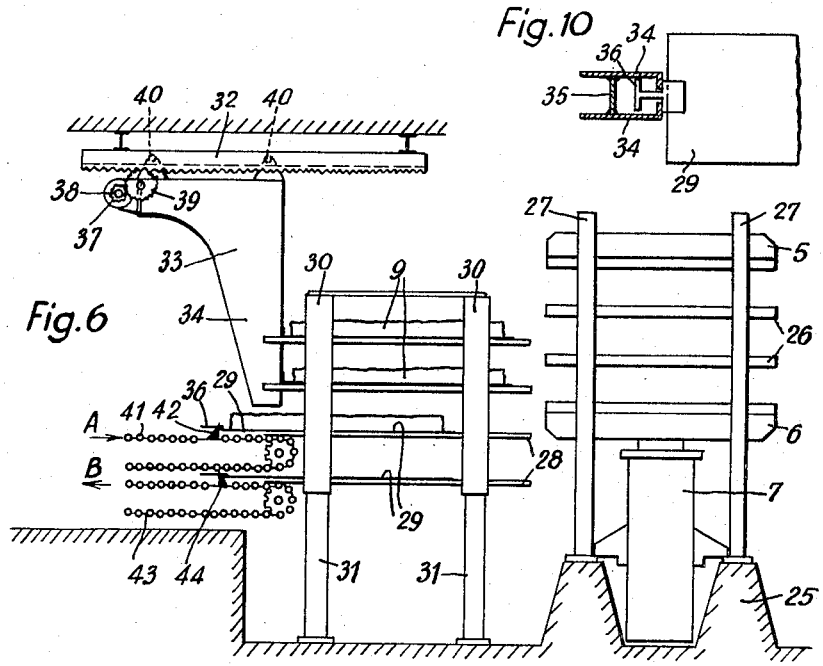
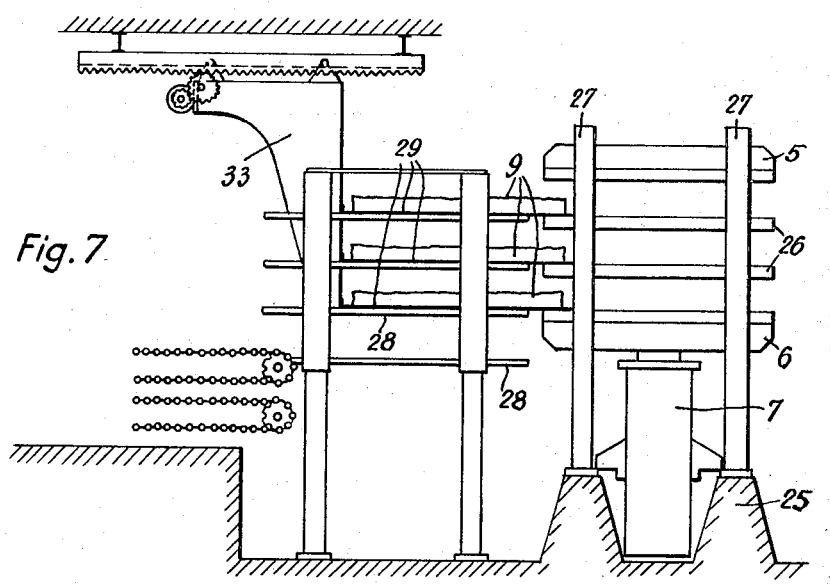

March 5, 1968   F. PAERELS ET AL   3,372,217
METHOD AND APPARATUS FOR THE MANUFACTURE OF PRESSED BOARDS
Filed Oct. 30, 1961   4 Sheets-Sheet 4

INVENTORS
FRANCISCUS PAERELS
WERNER ERNST HOSTETTLER
By:- James M. Heilman
ATTORNEY United States Patent Office 3,372,217
Patented Mar. 5, 1968

3,372,217
METHOD AND APPARATUS FOR THE MANU-
FACTURE OF PRESSED BOARDS
Franciscus Paerels and Werner Ernst Hostettler, Zurich,
Switzerland, assignors to Fred Fahrni, Zurich, Switzerland
Filed Oct. 30, 1961, Ser. No. 148,340
Claims priority, application Switzerland, Oct. 28, 1960,
12,099/60
7 Claims. (Cl. 264—122)

The problem on which the invention is based relates to the construction of a simple, compact and therefore easily supervised installation for the manufacture of pressed boards, in particular wood shaving boards, without having to invest considerable capital in the same. At the same time it was kept in mind that the purpose was to bring considerable simplification to the pressed board manufacturing process and to cheapen it as far as possible. This can however by no means be achieved by simply reducing the size of a large installation with all its complicated machines. One of the disadvantages of the known installations resides principally in the fact that the particles have to be scattered onto tin trays, which are used to transport the blanks to the heating press and which remain in the press until the pressing of the boards is finished. The main defect may be seen in the fact that after the pressing operation it is necessary to remove these trays from the heated press and after having suitably cooled them, to bring them back to the scattering station on a transport carriage specially provided for the purpose. At the same time the weight, respectively the thickness of the tin trays must be frequently checked, as otherwise the wear of the trays and the resulting loss in weight, respectively in thickness of the same will infallibly cause uneven scattering or the production of boards having an incorrect thickness. It has already been proposed to begin by slipping the blanks formed by the scattering of particles onto the trays onto an intermediate base forming part of a press feeding device, to insert the blank together with its supporting base in the open press and then to withdraw the base, so that the particle board is compressed directly between the plates of the press.

In the method of the invention an important simplification is achieved in that a particle blank is formed by scattering particles onto a supporting base, and in that the supporting base furnished with the particle blank is slipped between the heated plates of a press, after which before the press is closed the supporting base is withdrawn from under the blank and the latter is deposited on the lower plate of the press. In this manner it is possible to make the scattering base perform several functions. It now also fulfills important functions in the feeding of the press. Owing to this it is possible, in particular in the case of small installations with a single layer press, to manufacture high quality boards while keeping the outlay astonishingly low.

According to a further aspect of the invention, such a method is to be carried out by means of a device having the following features:

(a) a scattering device to form the particle blanks,
(b) a heated press,
(c) at least a supporting base to carry the layer of particles,
(d) means to move a supporting base carrying a particle blank from the particle scattering station into the open press,
(e) means to withdraw the supporting base from the press and to convey it back to the scattering station, and
(f) means to deposit the blanks on the lower plate of the press whilst the supporting base is being withdrawn from the press.

In the following several embodiments of the invention are described by way of examples with reference to the drawing.

FIGURE 4 concerns an installation having a supporting base comprising an endless belt.

FIGURE 5 illustrates an enlarged sectional view of a detail of the device shown in FIG. 4 as the mat is loaded into a pre-press or final consolidating press.

FIGURES 6 to 9 illustrate in a simplified representation side views of the press, loading frame and conveyor means, each view showing one of four different working phases.

FIGURE 10 shows a plan view, partially in cross section, of a blank supporting base, just in the act of being engaged by a pusher arm of the loading device.

In all the figures similar parts are indicated by the same cipher, even though the construction of these parts may vary from one embodiment to the other.

Figure 1:
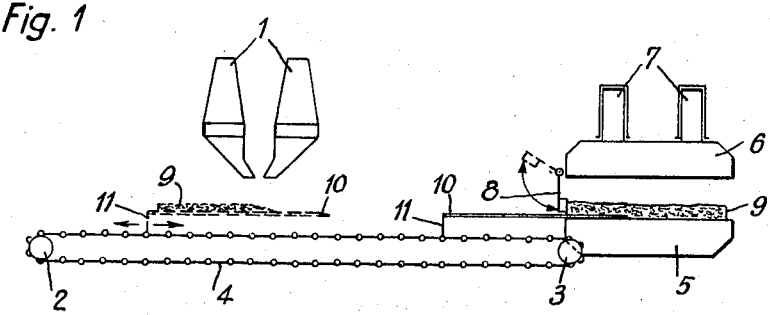
FIGURE 1 illustrates a diagrammatic side view of a device in which the supporting base serving both to form the blanks and to introduce them into the press is rigid.

The device according to FIG. 1 is provided with a scattering device 1 fitted with corresponding stocking hoppers. By means of this two layers of particles may be formed and laid one on the other in one passage (relative motion between scattering station and supporting base). For instance the one layer can consist of fine particles and the other of rather coarser particles. Further scattering stations may naturally be mounted one behind the other according to requirements. Under this scattering station is mounted a chain transport system, comprising the chain wheels 2 and 3 and an endless chain 4, which extends up to the single layer hydraulically operated press comprising the pressing table 5 and the ram 6. The press plunger, only sketchily indicated in the drawing is shown at 7. A stopping, respectively stripping plate 8, the function of which will be described below, is mounted on the ram 6 so that it is capable of effecting a swinging motion. The said chain transport system serves to transport a rigid supporting base receiving the particles, which is secured to the chain 4 by means of a link 11 and which according to the principle of the invention serves at the same time to feed the press 5, 6. The supporting base 10 can for instance rest on a grid which has not been shown in the drawing.

Figure 2:
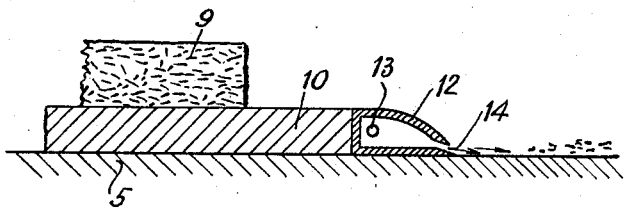
FIGURE 2 shows an enlarged sectional view of the front part of such a supporting base.

It may be seen in the enlarged sectional view of FIG. 2, that the sliding supporting press base 10 is connected at its front end with a hollow member 12, which is nose-shaped in cross section. This member is provided with an air connection 13 and with a slit-shaped nozzle 14 extending along the whole width.

Making use of the device the construction of which has just been described, the method is carried out as follows:

To begin with the supporting base 10 is situated directly under the particle scattering respectively heaping device 1. As the particles flow down, the supporting base is moved several times back and forth by successive changes in the driving direction of the chain transport system 2, 3 and 4, thus producing the formation of a multi-layer particle blank 9. After this the supporting base 10 together with the blank 9 is introduced into the open press 5, 6. During this motion compressed air flows through the duct 13 into the hollow projecting nose 12 and escapes through the nozzle 14. The nozzle slot being relatively narrow an adequate air pressure will cause the speed of the escaping air stream to be sufficiently high to enable it to blow off any splinters, shavings or similar particles which may have been left on the press table 5 by the previously pressed board. In fact such particles can have an adverse influence, because the adhesive film coating them has already been subjected to the final hardening and thus prevents a satisfactory bonding with the particles of the board subsequently to be pressed. In certain cases it may be sufficient to make use of a strip of flexible material secured to the front edge of the supporting base 10 instead of the blowing device. After the blank 9 has been inserted in the open press, the stripping flap 8 is swung down to the position shown in FIG. 1 and locked in this position, after which the supporting base 10 is withdrawn. Owing to the flap 8 the blank remains in the press. It now rests directly on the press table 5. The supporting base 10 is now brought back to the position shown in dotted lines in order to allow the formation of a subsequent blank.

Figure 3:
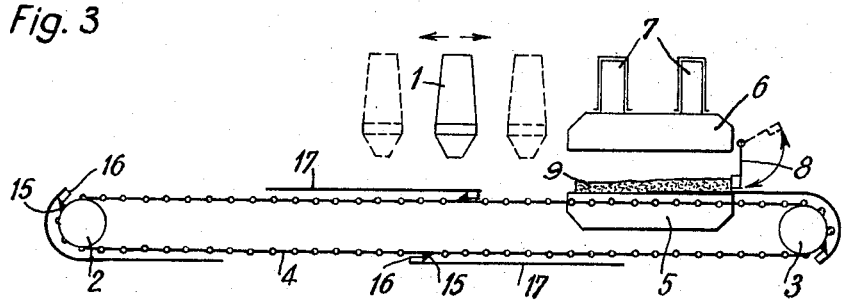
FIGURE 3 shows a diagrammatic side view of an installation having a flexible supporting base.

In the case of the device according to FIG. 3, the scattering device 1 has a reciprocating motion. Several flexible supporting bases 17 are provided in place of a rigid supporting base, and these are provided at their forward edge with laterally projecting transversal strengthening strips 16. These transversal strips 16 are engaged by cams 15 secured to the chain 4. The material used for the flexible supporting bases 17 may be for instance a tissue or a sheet of plastic material or metal. The flap 8 retaining the blank 9 during the withdrawal of the supporting base is fitted to the other side of the press, as in this particular case the supporting base is not drawn back but leaves the press on the other side of the latter.

During the scattering operation the chain is at rest. The general arrangement is such that whilst the scattering and heaping of the particles is being effected by moving back and forth the scattering station 1, the blank 9 prepared by the previous scattering operation is being compressed to form a board. After a blank has been compressed, the hot press is opened, the board is thrust out by suitable means and the next blank is deposited on the press table 5. The supporting base 17 leaves the press before it closes again and is conveyed back to the scattering station 1 by the lower strand of the chain 4. Before the press closes, it is necessary to swing the stripper 8 upwards out of the way.

In the case of the embodiment according to FIGS. 4 and 5 a transport device comprising an endless transport belt 23 is provided for the heaping up of the particles and the feeding of the press. This transport device is composed of a guiding table 18 carried by two chains 4, a hollow belt guiding body 19 having a projecting member 21, a guiding roller 24 and a belt 23 running over the guiding body 19 and the projecting member 21 as well as the guiding roller 24. The chain line 4 extends over the press 5, 6. It is for this reason that it is composed of two chains 4, one of each of which extends on one side of the press.

The belt fulfills two functions. The first is to move with a reciprocating motion at times when the particle scattering device 1 is in operation and discharging particles. In this way a blank composed of a number of layers of particles is formed. The second function is to deposit the blank thus formed on the press table 5. For this purpose the whole device is run into the open press after which it is withdrawn with the belt running at the same time, the direction of motion of the belt and its speed being chosen in such a manner that the upper strand of the belt remains motionless in relation to the press during this return motion. This manner of depositing the blank is very effective in preserving it from damage.

In order that the friction between the belt and its supporting members may be kept as low as possible, and in order to allow a particularly small radius of curvature to be given to the forward deflecting edge, it is recommended to blow compressed air between the belt and its supports. The nozzles 20 and 22 are used for this purpose. Advantageously the pressure of the air escaping through the nozzles 22 will be greater than that at the nozzle 20. Tests have shown that the friction between the belt and its support can be reduced to a very small value owing to the formation of this intermediate air film. The principle of this fraction reducing compressed air layer can also be applied with advantage to other devices in which it is desired for some reason or other to reduce the friction between a guiding surface and a belt.

In the case of the embodiment of FIGS. 6 to 10, a multi-layer press for the production of pressed boards by the hot compression of particle blanks having an admixture of bonding means is mounted on a fundament 25 and comprises a hydraulic pressing device 7, a vertically movable press ram 6, a fixed upper press plate 5, two sliding hot plates 26 and four columns 27. A loading frame which can be raised and lowered precedes the press and has a total of four tiers, as opposed to the main press which only has three layers. Two lateral rails 28 are provided in each tier of the loading frame to take up one supporting base 29. The supporting bases 29 serve to carry the blanks 9, and this from the moment of formation of the blanks (by scattering wood shavings of the like) until the blanks are deposited in the multi-layer press. The mutual vertical spacing of the carrier rails 28 which are secured to hydraulic cylinders 30 is invariable, as opposed to the spacing of the layers of the main press. The cylinders 30 move up and down fixed pistons 31 and are fed with a liquid under pressure in a known manner.

An inserting device having a pusher arm 33 hanging from a rack 32 so as to be able to slide horizontally along a guiding surface of the latter serves to insert the supporting bases 29 each bearing a blank 9 in the press 5–7. This pusher arm 33 consists of two plates 34 bent in the shape of hooks connected by a web 35. Mushroom-shaped traction hooks 36 provided on the supporting bases 29 can penetrate in the hollow space thus formed which is open at the bottom and is laterally accessible from outside through a vertical slot (FIG. 10). Such a positive connection is effected by raising the loading frame bearing the supporting bases 29 when the inserting device is in the position shown in FIG. 6. In addition, the pusher arm 33 carries an electric driving motor 37 on the shaft of which is keyed a pinion 38 meshing with a gear wheel 39. The gear wheel 39 meshes permanently with the rack 32. The carrying members of the inserting device are provided in addition with rollers 40, so that the whole device may be moved horizontally by means of a relatively small force. Control means, such as electric limit contacts or the like, are naturally provided for switching the motor 37 on and off.

A chain 41, carrying tappets 42 and running in the direction of the arrow A serves to bring the loaded supporting bases from the blank forming station or from a preliminary press to the loading frame, while a chain 43 running in the direction of the arrow B simultaneously withdraws the empty supporting bases from the loading frame by means of tappets 44.

The device, the construction of which has just been described operates in the following manner:

At the moment delineated in FIG. 6, a loaded supporting base is in the act of being inserted in the second tier counting from the bottom of the loading frame, this being effected by means of a tappet 42 of the chain 41. The chain 43 simultaneously withdraws the empty supporting base 29 from the lowest tier of the frame by means of the tappet 44 and from there returns it to the blank forming station. The press is open.

Figure 8:
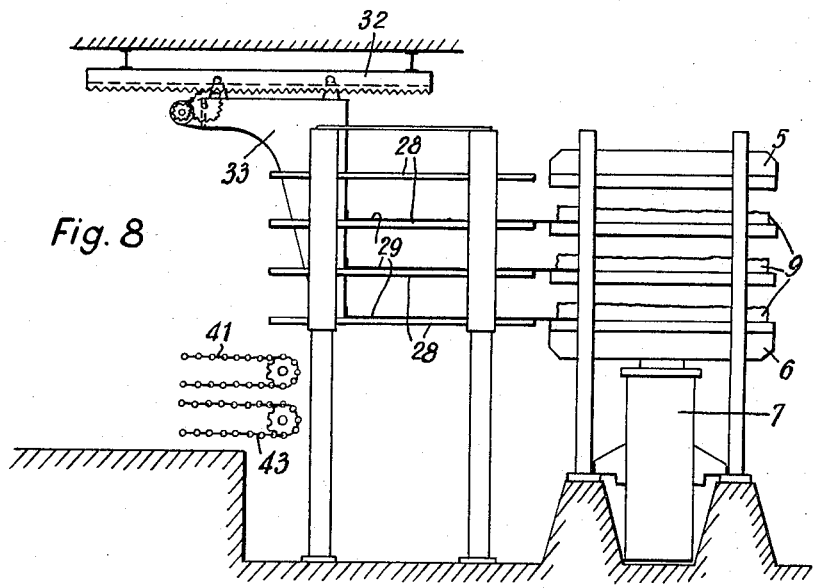
Figure 9:
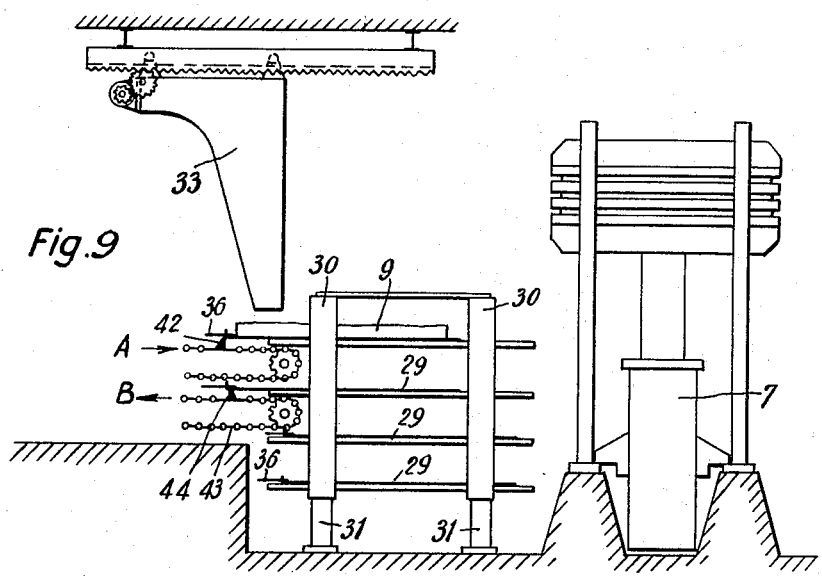

In the next working phase (FIG. 7) the three loaded supporting bases 29 are inserted in the press by means of the pusher arm 33. At the moment when this inserting motion stops, the loading frame is raised by one step in relation to the press, upon which the supporting bases are suddenly withdrawn (FIG. 8). The mass inertia of the blanks causes them to be deposited in the press. Of course, the press could be fitted with swinging or sliding stops, which come into operation after the loaded supporting bases 29 have been inserted to retain the blanks in place while the supporting bases are being withdrawn. The supporting bases which have been withdrawn now occupy the three lowest tiers of the loading frame. Its uppermost tier remains empty owing to the raising of this frame after the loading of the frame but before the withdrawal of the emptied supporting bases 29.

The described loading of the press having been effected the latter is closed and the loading frame is completely lowered. Thanks to this appropriate measure a loaded supporting base can now be inserted in the uppermost tier of the frame while simultaneously an emptied supporting base is being withdrawn from the second uppermost tier. After this operation, the frame is raised by one tier, whereupon the same operation takes place for the second and third tiers. After that, the third tier from the top is provided with a loaded supporting base while the empty supporting base is simultaneously withdrawn from the lower tier of the frame (FIG. 6). The working cycle now starts again from the beginning. It may be seen, particularly in FIG. 6, that as the loading frame is raised step by step, the mushroom-shaped traction hooks 36 of the supporting bases 29 are successively inserted in the slotted hollow space of the pusher arm 33. In the lowered position of the loading frame illustrated in FIG. 9, these hooks are no longer in engagement with the pusher arm 33.

The new method described above makes it possible to insert the loaded supporting bases coming from the blank forming station individually in the loading frame while simultaneously removing an emptied supporting base from the loading frame and returning it to the blank forming station.

What we claim is:

1. A device characterized by the combination of the following means:
   (a) a scattering device to form the particle blanks,
   (b) a press,
   (c) at least one supporting base to carry the particle blank,
   (d) driven conveyor means located between the scattering device and the press to move a supporting base carrying a particle blank from the particle scattering device into the open press,
   (e) means to withdraw the supporting base from the press and to convey it back to the scattering device,
   (f) automatically operated retaining means provided in the region of the press for keeping the blank on the lower plate of the press motionless while the supporting base is being withdrawn from the press, and
   (g) characterized in that the supporting base is provided with air nozzles at the edge which is foremost when it is being inserted in the open press, and that these nozzles are connected to an air feed through hollow spaces.

2. In a method for the manufacture of pressed boards from wood particles provided with bonding substances, characterized in forming a particle blank below a scattering device by scattering on an endless belt of a transport device, inserting this transport device in the open press, and withdrawing this device from the press while running the belt at the same time, the direction of motion of the belt and its speed being chosen in such a manner that the upper portion of the belt remains motionless in relation to the press plates during this withdrawing motion in order to deposit the blank on the lower press plate without relative motion between the blank and the press plate, and further characterized in that during the scattering operation running the upper portion of the belt alternatively back and forth below the scattering device while the transport device is motionless.

3. In a method for the manufacture of pressed boards from wood particles provided with bonding substance, characterized in forming a particle blank below a scattering device by scattering on an endless belt of a transport device, inserting this transport device in the open press, and withdrawing this device from the press while running the belt at the same time, the direction of motion of the belt and its speed being chosen in such a manner that the upper portion of the belt remains motionless in relation to the press plates during this withdrawing motion in order to deposit the blank on the lower press plate without relative motion between the blank and the press plate, and further characterized in blowing compressed air directly between the transport belt and its supporting portion of the transport device in order to reduce the friction between the belt and its support.

4. In a method for the manufacture of pressed boards from wood particles provided with bonding substances, characterized in forming a particle blank below a scattering device by scattering particles onto a supporting base, transporting the supporting base loaded with the particle blank from the scattering device to a press, and slipping the supporting base between the plates of the press, and withdrawing the supporting base from under the blank and depositing the latter on the lower plate of the press before closing the press, and further characterized in scattering the particles on a flexible base, and retaining the particle blanks in place after inserting in the open press while the base continues its motion in the same direction and leaves the press at the opposite side thereof wtih respect to the side where introduced into the press.

5. In a method for the manufacture of pressed boards from wood particles provided with bonding substances, characterized in forming a particle blank below a scattering device by scattering particles onto a supporting base, transporting the supporting base loaded with the particle blank from the scattering device to a press, and slipping the supporting base between the plates of the press, and withdrawing the supporting base from under the blank and depositing the latter on the lower plate of the press before closing the press, and further characterized in that while inserting the base in the open press sweeping the lower pressing surface of the latter clear by means of jets of compressed air ejecting from the front side part of the base.

6. A device characterized by the combination of the following means:
   (a) a scattering device to form the particle blanks,
   (b) a press,
   (c) at least one supporting base to carry the particle blank,
   (d) driven conveyor means located between the scattering device and the press to move a supporting base carrying a particle blank from the particle scattering device into the open press,
   (e) means to withdraw the supporting base from the press and to convey it back to the scattering device,
   (f) automatically operated retaining means provided in the region of the press for keeping the blank on the lower plate of the press motionless while the supporting base is being withdrawn from the press,
   (g) characterized in that the supporting base is constituted by a transport device comprising driving means and an endless belt, the upper portion being flat and adapted to carry a particle blank, and
   (h) further characterized in that the support for the belt is provided with air outlet openings and air pipes for compressed air, said air pipes being connected to said outlet openings.

7. A device characterized by the combination of the following means:
   (a) a scattering device to form the particle blanks,
   (b) a press, (c) at least one supporting base to carry the particle blank, (d) driven conveyor means located between the scattering device and the press to move a supporting base carrying a particle blank from the particle scattering device into the open press, (e) means to withdraw the supporting base from the press and to convey it back to the scattering device.

(f) automatically operated retaining means provided in the region of the press for keeping the blank on the lower plate of the press motionless while the supporting base is being withdrawn from the press, and (g) characterized in that the supporting base is made of flexible material, and in that the means for conveying the supporting base extend beyond the press in order to convey the supporting base through the open press.

References Cited

UNITED STATES PATENTS

| | | | |
|---|---|---|---|
| 3,077,271 | 2/1963 | Siempelkamp | 214—16.6 |
| 1,842,008 | 1/1932 | Borer | 156—369 |
| 2,601,349 | 6/1952 | Welch | 156—540 X |
| 2,538,972 | 1/1951 | Magnani | 264—76 |
| 2,373,539 | 4/1945 | Carver | 100—215 |
| 1,196,036 | 8/1916 | Sills | 156—369 |
| 2,376,457 | 5/1945 | Skoog | 214—16.6 XR |
| 2,593,012 | 4/1952 | Croston | 214—16.6 |
| 2,728,468 | 12/1955 | Siempelkamp | 214—16.6 |

EARL M. BERGERT, *Primary Examiner.*

A. WYMAN, *Examiner.*

P. R. WYLIE, W. E. HOAG, *Assistant Examiners.*